United States Patent
Chen (10) Patent No.: US 11,248,936 B2
(45) Date of Patent: Feb. 15, 2022

(54) PROCESS TRANSMITTER HAVING A ROTATABLE COUPLING

(71) Applicant: Rosemount Inc., Shakopee, MN (US)

(72) Inventor: Fang Chen, Beijing (CN)

(73) Assignee: ROSEMOUNT INC., Shakopee, MN (US)

( * ) Notice: Subject to any disclaimer, the term of this patent is extended or adjusted under 35 U.S.C. 154(b) by 574 days.

(21) Appl. No.: 15/735,334

(22) PCT Filed: Aug. 29, 2017

(86) PCT No.: PCT/CN2017/099429
§ 371 (c)(1),
(2) Date: Dec. 11, 2017

(87) PCT Pub. No.: WO2019/041122
PCT Pub. Date: Mar. 7, 2019

(65) Prior Publication Data
US 2019/0063648 A1    Feb. 28, 2019

(51) Int. Cl.
*G01D 11/24* (2006.01)
*F16L 27/08* (2006.01)
(Continued)

(52) U.S. Cl.
CPC ............ *G01D 11/245* (2013.01); *F16L 15/08* (2013.01); *F16L 27/08* (2013.01); *F16L 41/008* (2013.01);
(Continued)

(58) Field of Classification Search
CPC ......... F16L 27/08; F16L 41/008; F16L 15/08; F16L 15/008; F16L 15/02; F16L 15/006; G01D 11/245
(Continued)

(56) References Cited

U.S. PATENT DOCUMENTS 4,970,898 A * 11/1990 Walish ................ G01L 19/0038
  73/706
5,447,083 A   9/1995 Handerson
(Continued)

FOREIGN PATENT DOCUMENTS

CA    2 217 982    4/1998
CN    1100501 A    3/1995
(Continued)

OTHER PUBLICATIONS

Notification of Transmittal of the International Search Report and the Written Opinion of the International SearchingAuthortiy for PCT/CN2017/099429, dated May 25, 2018.
(Continued)

*Primary Examiner* — Marrit Eyassu
(74) *Attorney, Agent, or Firm* — Westman, Champlin & Koehler, P.A.

(57) ABSTRACT

An industrial process transmitter includes a main housing, a sensor body, and a flange member. The main housing contains transmitter circuitry and includes a first threaded portion. The sensor body includes a process sensor and a second threaded portion in threaded engagement with the first threaded portion. One of the first and second threaded portions includes a threaded cylindrical projection, and the other includes a threaded cylindrical bore. The flange member is received within a groove of the projection. Movement of the sensor body relative to the housing along an axis of the bore is restricted to an axial distance through engagement between the flange and the first or second threaded portion that includes the threaded cylindrical bore, and engagement between the main housing and the sensor body. Rotation of the sensor body relative to the housing about the axis is limited by the axial distance.

16 Claims, 4 Drawing Sheets

(51) Int. Cl.
    *F16L 15/08*     (2006.01)
    *F16L 41/00*     (2006.01)
    *F16L 15/00*     (2006.01)
    *F16L 15/02*     (2006.01)

(52) U.S. Cl.
    CPC ........... *F16L 15/006* (2013.01); *F16L 15/008* (2013.01); *F16L 15/02* (2013.01)

(58) Field of Classification Search
    USPC ......................................................... 73/431
    See application file for complete search history.

(56) References Cited

U.S. PATENT DOCUMENTS

| | | | | |
|---|---|---|---|---|
| 6,050,145 | A * | 4/2000 | Olson | G01L 19/0084 73/706 |
| 6,112,599 | A * | 9/2000 | Maki, Jr. | G01N 29/11 73/587 |
| 6,148,681 | A * | 11/2000 | Gravel | G01F 23/268 73/866.5 |
| 6,511,337 | B1 * | 1/2003 | Fandrey | H05K 7/1462 439/206 |
| 6,578,769 | B1 | 6/2003 | Mathew et al. | |
| 7,426,870 | B2 * | 9/2008 | Tanner | G01D 11/24 73/761 |
| 7,614,277 | B2 | 11/2009 | Yokoi et al. | |
| 8,299,938 | B2 * | 10/2012 | Hedtke | G01D 7/002 340/870.02 |
| 8,459,124 | B2 | 6/2013 | Wang et al. | |
| 9,329,061 | B2 | 5/2016 | Vanderaa | |
| 9,568,136 | B2 | 2/2017 | Fadell et al. | |
| 9,612,137 | B2 | 4/2017 | Gansen | |
| 2005/0172738 | A1 * | 8/2005 | Broden | F16J 15/061 73/866.5 |
| 2005/0183522 | A1 | 8/2005 | Smith | |
| 2006/0121301 | A1 | 6/2006 | Tanner | |
| 2007/0113618 | A1 | 5/2007 | Yokoi et al. | |
| 2007/0268153 | A1 | 11/2007 | Gansen | |
| 2008/0202235 | A1 | 8/2008 | Laps et al. | |
| 2011/0290032 | A1 | 12/2011 | Wang et al. | |
| 2011/0292195 | A1 | 12/2011 | Dahmen | |
| 2012/0279580 | A1 * | 11/2012 | Hausler | G01L 19/0636 137/82 |
| 2014/0238126 | A1 * | 8/2014 | Vanderaa | G01D 11/24 73/431 |
| 2016/0237759 | A1 * | 8/2016 | Li-Leger | E21B 17/02 |
| 2016/0305798 | A1 | 10/2016 | Breunig et al. | |
| 2016/0359286 | A1 | 12/2016 | Gerber | |
| 2019/0003265 | A1 * | 1/2019 | McLaughlin | F16L 19/005 |

FOREIGN PATENT DOCUMENTS

| | | |
|---|---|---|
| CN | 1669375 | 9/2005 |
| CN | 100484373 | 4/2009 |
| CN | 101922988 | 12/2010 |
| CN | 103278187 | 9/2013 |
| CN | 203337165 | 12/2013 |
| CN | 203455132 | 2/2014 |
| CN | 204255390 | 4/2015 |
| DE | 10 2012 221 869 | 6/2014 |
| EP | 0589666 A1 | 3/1994 |
| JP | 62-159017 | 7/1987 |
| JP | 06-160124 | 6/1994 |
| JP | 10-132638 | 5/1998 |
| JP | 2007-139689 | 6/2007 |
| JP | 2013-531230 | 8/2013 |
| JP | 2014-170933 | 9/2014 |

OTHER PUBLICATIONS

Communication pursuant to Rules 161(2) and 162 EPC, for International Application No. PCT/CN2017/099429, dated Mar. 26, 2020, 3 pages.
Office Action from Chinese Patent Application No. 201780001193.4, dated Oct. 29, 2020.
Office Action from Japanese Patent Application No. 2020-512036, dated Nov. 24, 2020.
Supplementary European Search Report from European Patent Application No. 17923032.1, dated Mar. 1, 2021.
Communication Pursuant to Rules 70(2) and 70a(2) EPC from European Patent Application No. 17923032.1, dated Mar. 18, 2021.
Office Action from Japanese Patent Application No. 2020-512036, dated Mar. 25, 2021.
Second Office Action from Chinese Patent Application No. 201780001193.4, dated May 25, 2021.

* cited by examiner

PROCESS TRANSMITTER HAVING A ROTATABLE COUPLING

CROSS-REFERENCE TO RELATED APPLICATION

This Application is a Section 371 National Stage Application of International Application No. PCT/CN2017/099429, filed Aug. 29, 2017, not yet published, the contents of which are hereby incorporated by reference in their entirety.

FIELD

Embodiments of the present disclosure relate to industrial process transmitters and, more particularly, to a rotatable coupling between a main housing and a sensor body of an industrial process transmitter.

BACKGROUND

Industrial processes are used in many industries to process or transport various materials. Industrial processes are implemented in processing plants, such as, oil refineries, food manufacturing facilities, and paper pulp manufacturing facilities, for example.

Process control systems are used to monitor and control inventories of industrial and chemical processes, and the like. Typically, the control system performs these functions using field devices or process transmitters that are distributed at key locations in the industrial process. The term "process transmitter" refers to any device that performs a function in a distributed industrial control or process monitoring system, including all devices currently known, or yet to be known, that are used in the measurement, control, and/or monitoring of industrial processes.

Process transmitters typically include a main housing that encases transmitter circuitry. The transmitter circuitry enables the process transmitter to perform conventional field device tasks, such as process parameter monitoring and measurements using one or more sensors, and/or process control operations using one or more control elements. Exemplary sensors include pressure sensors, flow sensors, level sensors, temperature sensors, and other sensors used in industrial processes. Exemplary control elements include actuators, solenoids, valves, and other control elements.

Process sensors may be supported or contained in a sensor body, which is attached to the main housing. The sensor body may provide an interface between the process variable sensor and the process that is to be sensed or measured. Additionally, the sensor body may support or house sensor circuitry that conveys sensed process parameters to the transmitter circuitry.

SUMMARY

Embodiments of the present disclosure relate to industrial process transmitters and, more particularly, to a rotatable coupling between a main housing and a sensor body of an industrial process transmitter. One embodiment of the process transmitter includes a main housing, a sensor body, and a flange member. The main housing contains transmitter circuitry and includes a first threaded portion. The sensor body includes a process sensor and a second threaded portion in threaded engagement with the first threaded portion. One of the first second threaded portions includes a threaded cylindrical projection, and the other of the first and second threaded portions includes a threaded cylindrical bore. Relative rotation between the sensor body and the main housing about an axis of the bore causes relative movement between the sensor body and the main housing along the axis. The flange member is received within a groove of the projection. Movement of the sensor body relative to the housing along an axis of the bore is restricted to an axial distance that is bounded through engagement between the flange member and the first or second threaded portion that includes the threaded cylindrical bore, and engagement between the main housing and the sensor body. Rotation of the sensor body relative to the housing about the axis is limited by the axial distance.

Another embodiment of the process transmitter includes a main housing comprising a cylindrical bore, transmitter circuitry contained in the main housing, and a sensor body comprising a process sensor configured to sense an industrial process, and a cylindrical projection received within the bore. A flange member received within a groove of the projection, and a compressible member compressed in a direction along an axis of the cylindrical bore. Movement of the sensor body relative to the main housing along the axis of the bore is restricted to an axial distance. Movement of the sensor body relative to the main housing in a first direction along the axis is limited through engagement between the main housing and the flange. Movement of the sensor body relative to the main housing in a second direction along the axis is limited through engagement between the main housing and the sensor body. Rotation of the sensor body relative to the main housing is resisted by the compressible member.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

Figure 1:
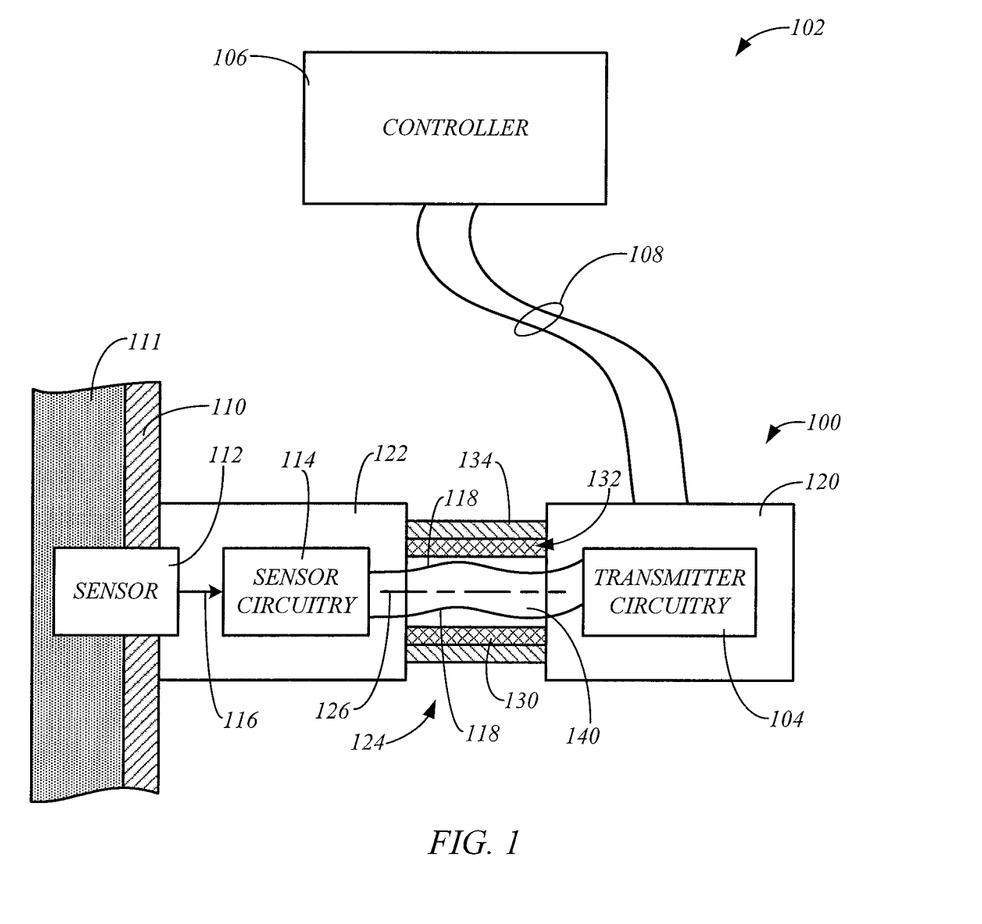
FIG. 1 is a simplified diagram of an exemplary industrial control system including an exemplary process transmitter formed in accordance with embodiments of the present disclosure.

FIG. 1 is a simplified diagram of an exemplary process transmitter 100 of a control system 102, in accordance with embodiments of the present disclosure. In some embodiments, the transmitter 100 includes transmitter circuitry 104, which represents circuitry that enables the performance of conventional process transmitter tasks, such as process parameter monitoring and measurements using one or more sensors, process control operations using one or more control elements, electronic communications, and/or another conventional process transmitter task.

In some embodiments, the process transmitter circuitry 104 is configured to communicate with a controller 106, which may be remotely located in a control room, for example. Such communications may occur over a conventional two-wire process control loop 108 (e.g., 4-20 milliamp control loop), which may also provide power to the process transmitter 100. Communications over the two-wire loop 108 may include analog and/or digital communications. Exemplary analog communications include the control of a current flowing through the loop, which can represent a process variable value, for example. Exemplary digital communications include digital signals that are modulated onto the analog current level of the two-wire process control loop 108, such as the HART® communication standard. Other purely digital techniques may also be employed including Foundation® FieldBus and Profibus communication protocols. In some embodiments, process transmitter 100 may communicate wirelessly with the controller 106 using, for example, conventional radio frequency (RF) communication techniques.

The process transmitter 100 may be coupled to an industrial process vessel 110, such as a pipe, a tank, or another industrial process vessel, that contains a process material. The process transmitter 100 may include a process sensor 112 that may be used to sense or measure a parameter of a process material 111 contained in the vessel 110. As mentioned above, exemplary process parameters include a temperature of the material, a level of the material in a tank vessel, a pressure within a vessel, a flow rate of the material through the vessel, or another parameter of the process. Exemplary sensors 112 include pressure sensors, temperature sensors, level sensors (e.g., tuning fork level switch, or radar level sensor), flow rate sensors, and/or other sensors used to sense or measure a process parameter.

Sensor circuitry 114 represents circuitry that processes output signals 116 from the sensor 112 that are representative of the sensed or measured process parameter. The sensor circuitry may process the output signals 116 (e.g., amplifies, compensates, digitizes, etc.) as desired using conventional techniques. In some embodiments, the sensor circuitry 114 communicates the sensed or measured parameter indicated by the signal 116 to the transmitter circuitry 104 through one or more wires 118, or through a wireless communication protocol. The transmitter circuitry 104 may then communicate the measured parameter to the controller 106 in accordance with an analog or digital communication protocol, such as those discussed above.

The process transmitter 100 may also be configured to control an aspect of the process using one or more control elements, such as actuators, solenoids, valves, and/or another conventional process control element used in field devices to control a process. In order to simplify the illustrations, these control element embodiments of the transmitter 100 are represented by the sensor 112 and/or the circuitry 114. Accordingly, in some embodiments, the transmitter circuitry 104 may receive an instruction to adjust a control element from the controller 106. The transmitter circuitry 106 then communicates a signal to the control element to make the adjustment, such as an adjustment to a valve position, for example.

In some embodiments, the transmitter circuitry 104 is contained in a main housing 120, and the sensor 112 and/or the sensor circuitry 114 are supported or contained in a sensor body 122, as shown in FIG. 1. A rotatable coupling 124 operates to join the sensor body 122 to the housing 120, while allowing the sensor body 122 to rotate about an axis 126 relative to the housing 120. In some embodiments, the main housing 120, the sensor body 122, and the rotatable coupling 124 satisfy conventional explosion-proof requirements for industrial process transmitters, such as a requirement that a spark generated within the process transmitter will not ignite combustible gases or liquids of the industrial process.

Figure 2:
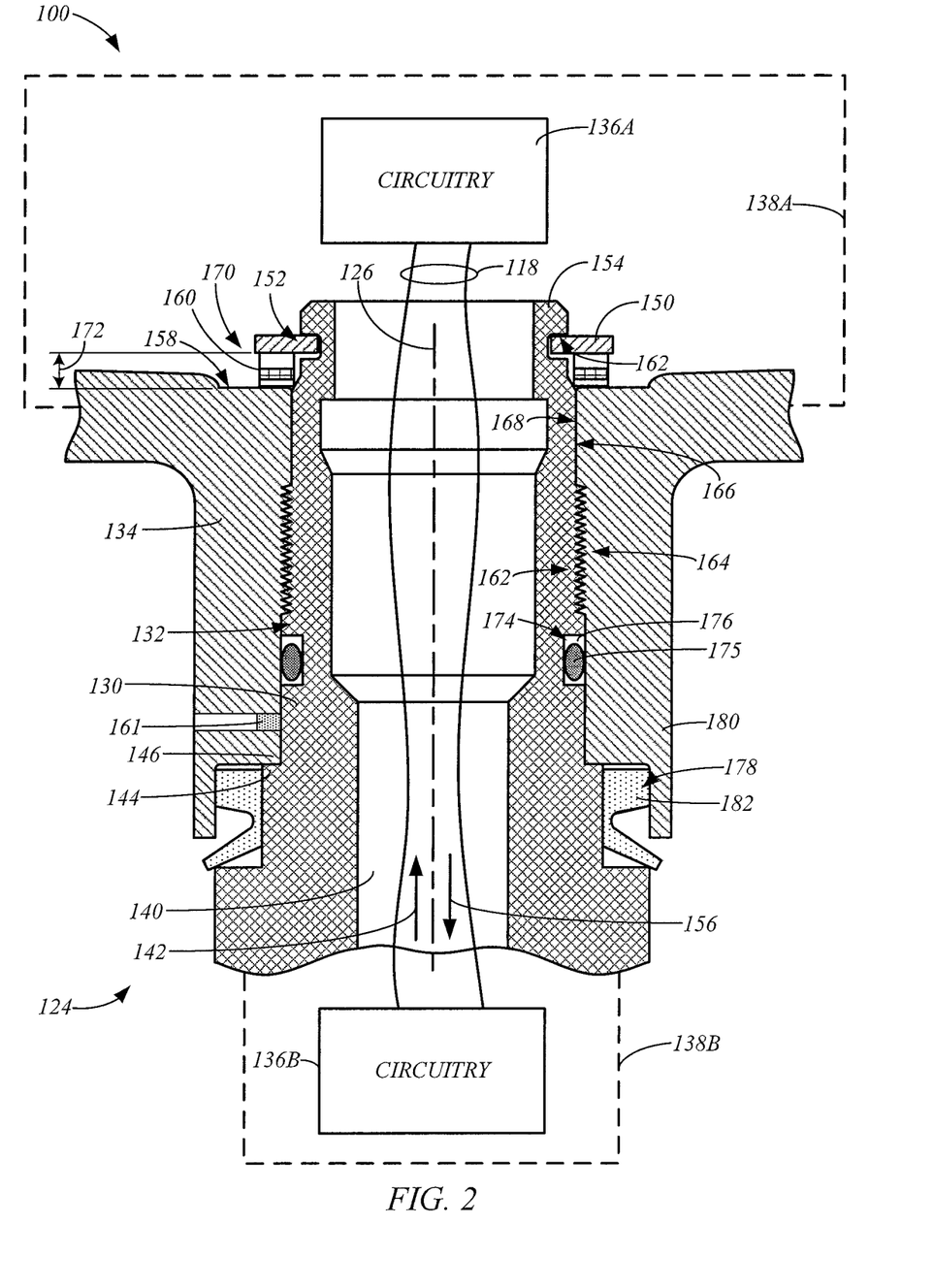
FIG. 2 is a simplified side view of a portion of an exemplary process transmitter formed in accordance with one or more embodiments of the present disclosure.

FIG. 2 is a simplified side view of a portion of an exemplary process transmitter 100 formed in accordance with one or more embodiments of the present disclosure. FIG. 2 focuses on the rotatable coupling 124 between the main housing 120 and the sensor body 122. In some embodiments, the rotatable coupling 124 includes a cylindrical projection or member 130 that is received within a cylindrical bore 132 formed within a portion 134. The projection 130 or the portion 134 having the bore 132 are formed as portions of the main housing 120, and the other of the projection 130 and the portion 134 having the bore 132 are formed as portions of the sensor body 122. Thus, when the projection 130 is formed as a portion of the main housing 120, the portion 134 having the cylindrical bore 132 is formed as a portion of the sensor body 122. Likewise, when the portion 134 having the cylindrical bore 132 is formed as a portion of the main housing 120, the projection 130 is formed as a portion of the sensor body 122.

The transmitter circuitry 104 and the sensor circuitry 114 or sensor 112 are each represented by circuitry 136A or circuitry 136B. The circuitry 136A is supported or contained in the housing 120 or sensor body 122 that includes the portion 134 having the cylindrical bore 132, as represented by phantom line 138A, while the circuitry 136B is supported or contained in the housing 120 or sensor body 122 that includes the projection 130, as represented by phantom line 138B.

In some embodiments, the cylindrical projection 130 includes an interior cavity 140, such as a cylindrical bore, through which the one or more wires 118 that are connected to the sensor circuitry 114 may extend, as shown in FIGS. 1 and 2. After securing the sensor body 122 to the main housing 120 through the rotatable coupling 124, the one or more wires 118 may then be connected to the transmitter circuitry 104, and the main housing may be sealed to complete the installation of the process transmitter.

Figure 3A:
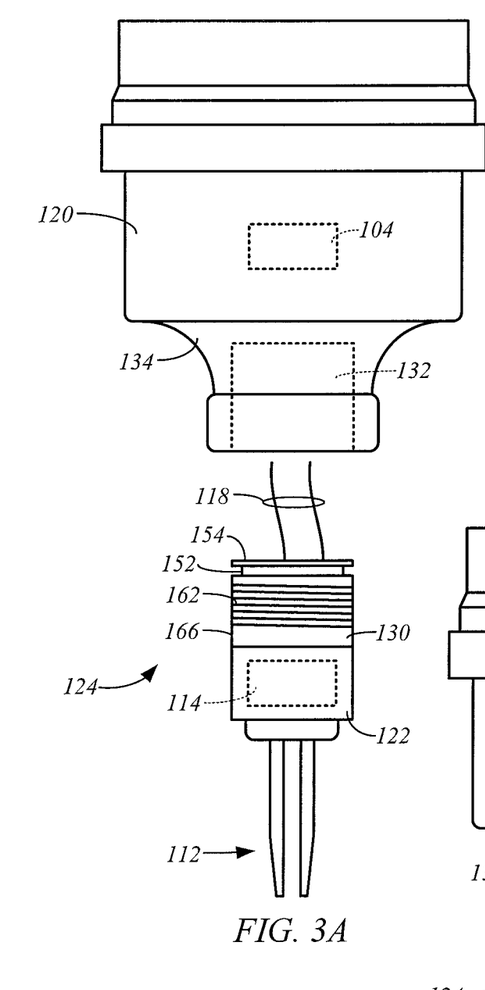
FIGS. 3A and 3B are exploded and assembled side views of an exemplary fork level switch process transmitter, in accordance with exemplary embodiments of the present disclosure.
Figure 3B:
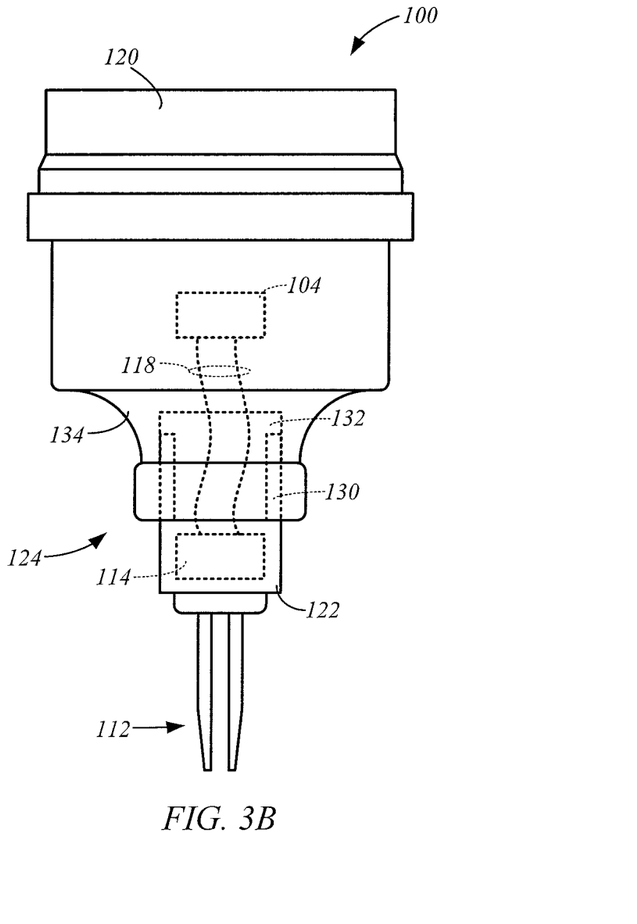

FIGS. 3A and 3B respectively are simplified exploded and assembled side views of an exemplary process transmitter 100 in accordance with exemplary embodiments of the present disclosure. The exemplary process transmitter 100 in FIGS. 3A and 3B includes a sensor 112 in the form of a fork level switch. The fork level switch 112 is supported by the projection 130, which also may support sensor circuitry 114 for the fork level switch 112. The transmitter housing 120 includes the portion 134 having the bore 132. In some embodiments, the transmitter 100 is assembled by inserting or screwing the projection 130 into the bore 132, and connecting the wires 118 to the transmitter circuitry 104, as generally illustrated in FIG. 3B. Access to the transmitter circuitry 104 during this installation process may be achieved by removing a cover of the housing 120.

In some instances, it may be necessary to rotate the sensor body 122 relative to the housing 120 after connecting the wires 118 to the transmitter circuitry 104. For example, when the sensor 112 includes a fork level switch (FIGS. 3A and 3B), the orientation of the fork level switch relative to the process material 111 and/or the vessel 110 (FIG. 1) may affect its level readings. As a result, installation of the process transmitter 100 may require rotation of the sensor 112 relative to the material 111 and/or the vessel 110 by rotating the sensor body 122 relative to the main housing 120 using the rotatable coupling 124.

Conventional rotatable couplings rely upon a threaded coupling between the sensor body and the main housing, and a set screw to fix the rotatable coupling and set the sensor body in a desired angular position relative to the main housing. When the set screw is withdrawn and does not fully secure the position of the sensor body relative to the main housing, such as when the set screw was not installed properly, is loosened due to vibration, or is purposefully withdrawn, the sensor body is able to rotate relative to the main housing. The sensor body can then be excessively rotated relative to the main housing before either decoupling the sensor body from the main housing, or encountering a rotational limit to the threaded coupling. This excessive rotation that is allowed by conventional rotational couplings, has led to damage to wires extending between the sensor body and the main housing, resulting in transmitter malfunction.

Some embodiments of the rotatable coupling 124 operate to allow for limited rotation of the sensor body 122 relative to the main housing 120 to allow for adjustment to the angular position of the sensor body 122, sensor 112 and/or sensor circuitry 114, relative to the main housing 120, while preventing excessive rotation therebetween that could damage components of the transmitter 100, such as the wires 118 extending between the sensor body 122 and the main housing 120, the connections of the wires 118 to the circuitry 104 or 114, and/or other components of the transmitter 100. Some embodiments of the rotatable coupling prevent undesired decoupling of the sensor body 122 and the main housing 120 through rotation of the sensor body 122 relative to the housing 120.

In some embodiments, movement of the projection 130 along the axis 126 in the direction indicated by arrow 142 relative to the bore 132 is restricted through engagement (i.e., direct contact or indirect contact through an intermediary member) between the main housing 120 and the sensor body 122. For example, the projection 130 may include a shoulder portion 144 that contacts a shoulder portion 146 of the portion 134 to restrict movement of the projection 130 in the direction 142 relative to the portion 134 and the bore 132, as shown in FIG. 2.

In some embodiments, the rotatable coupling 124 includes a flange member 150, which is received within a groove 152 of the projection 130, as shown in FIG. 2. The groove 152 may be an annular groove, as shown in FIG. 3A. In some embodiments, the groove 152 is located at a distal end 154 of the projection 130. The flange member 150 may be installed after the projection 130 is inserted into the bore 132 in the direction indicated by arrow 142 along the axis 126 of the bore 132, to place the distal end 154 within an interior of either the main housing 120 or the sensor body 122, as indicated by phantom line 138A.

Once installed in the groove 152, the flange member 150 restricts movement of the projection 130 along the axis 126 in the direction indicated by arrow 156, through direct engagement (i.e., contact) or indirect engagement (contact through an intermediary member) with the main housing 120 or the sensor body 122 having the portion 134 forming the bore 132. For example, movement of the projection 130 in the direction indicated by arrow 156 along the axis 126 may be restricted through engagement between the flange member 150 and a shoulder portion 158 of the main housing 120 or the sensor body 122 having the portion 134.

Figure 4:
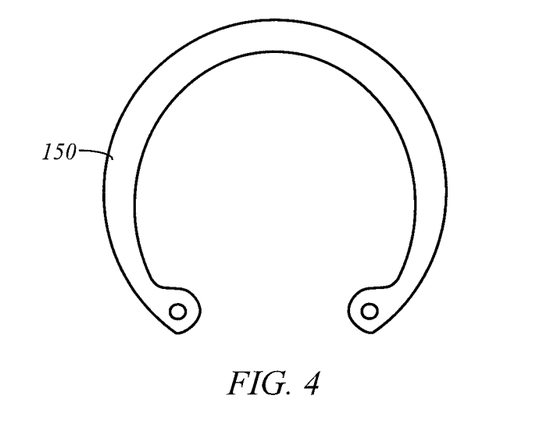
FIG. 4 is a top view of an exemplary retainer ring, in accordance with embodiments of the present disclosure.

The flange member 150 may be in the form of a retainer ring or other suitable component. A top view of an exemplary retainer ring 150 is shown in FIG. 4. Other suitable flange members 150 may also be used to restrict movement of the projection 130 in the direction 156 relative to the portion 134.

In some embodiments, a compressible member 160 is compressed along an axis that is parallel to the axis 126 between the main housing 120 and the sensor body 122. For example, the compressible member 160 may be compressed between the flange member 150 and a portion of the main housing 120 or sensor body 122 having the portion 134, such as shoulder portion 158, as shown in FIG. 2. Embodiments of the compressible member include a wave ring, an O-ring, or other suitable compressible member.

Figure 5:
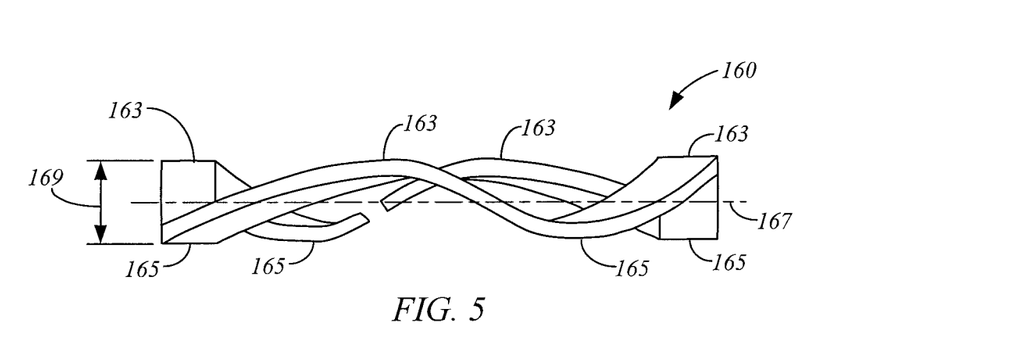
FIG. 5 is a side view of an exemplary wave ring, in accordance with embodiments of the present disclosure.

The compressible member 160 shown in FIG. 2 is in the form of an exemplary wave ring, and FIG. 5 is a side view of the exemplary wave ring 160. The wave ring 160 includes upper portions 163 and lower portions 165 that alternate around its circumference. The upper and lower portions 163 and 165 respectively extend above and below a horizontal plane 167, which is generally perpendicular to the axis 126 when the wave ring 160 is installed between the housing 120 and the sensor body 122. Thus, the effective thickness 169 of the wave ring 160 corresponds to the distance between a top surface of the upper portions 163 and a bottom surface of the lower portions 165, as shown in FIG. 5. This thickness of the wave ring 160 may be compressed along the axis 126 through pressure applied between the flange member 150 and the portion 134, as shown in FIG. 2. The wave ring 160 may be configured to provide a desired resistance to compression in the axial direction based on the material used to form the wave ring 160 and the thickness of the material. Exemplary materials that would be suitable for forming the wave ring 160 include stainless steel, aluminum, plastic, or another suitable material.

The compressible member 160 operates to drive the flange member 150 against an upper surface 162 of the groove 152. In some embodiments, this also drives the projection in the direction 142 relative to the portion 134, and maintains engagement between the portions of the main housing 120 and sensor body 122 that restrict movement of the projection 130 in the direction 156 relative to the portion 134, such as shoulder portions 144 and 146, for example. Accordingly, some embodiments of the compressible member 160 operate to eliminate gaps that would allow for loose movement between the projection 130 and the portion 134 along the axis 126.

In some embodiments, the compressible member 160 restricts rotational movement of the sensor body 122 relative to the housing 120 about the axis 126 through frictional resistance due to the axial compression of the member 160. For example, the frictional resistance between the member 160 and the flange 150 and the shoulder 158 resists rotation of the projection 130 relative to the portion 134. This allows the sensor body 122 to be set to a desired angular position about the axis 126 relative to the main housing 120. In some embodiments, a set screw 161 may be used to further secure the set angular position of the sensor body 122 about the axis 126 relative to the main housing 120, as shown in FIG. 2.

In some embodiments, the projection 130 and the bore 132 respectively include threaded portions 162 and 164, as shown in FIG. 2. The threaded portion 162 is formed on an exterior wall 166 of the projection 130, and the threaded portion 164 is formed on an interior wall 168 of the bore 132. This allows the sensor body 122 and the main housing 120 to be screwed together through threaded engagement between the portions 162 and 164 of the projection 130 and the portion 134. Thus, in some embodiments, rotation of the projection 130 relative to the bore 132 (i.e., portion 134) in one direction drives movement of the projection 130 along the axis 126 toward the portion 134 in the direction indicated by arrow 142, and rotation of the projection 130 relative to the bore 132 in the opposite direction drives movement of the projection 130 along the axis 126 away from the portion 134 in the direction indicated by arrow 156. The position of the projection 130 along the axis 126 and the angular position of the projection 130 about the axis 126 relative to the portion 134 may be set by the set screw 161.

In some embodiments, this rotationally driven movement of the projection 130 along the axis 126 relative to the portion 134 due to the engagement of the threaded portions 162 and 164, is limited to an axial distance 170 relating to a gap 172 formed between the flange member 150 and the shoulder portion 158 of the portion 134, when the portions of the sensor body 122 and the main housing limiting movement of the projection 130 relative to the portion 134 in the direction 142 are engaged, as shown in FIG. 2. The axial distance 170 is bounded in the direction 142 through the engagement between portions of the projection 130 and the portion 134 (e.g., shoulder portions 144 and 146), and the axial distance 170 is bounded in the direction 156 through engagement between the flange member 150 or the compressible member 160 (if present), and the shoulder portion 158. Thus, the axial distance 170 corresponds to the gap 172 when the compressible member 160 is not present. When the compressible member is present, the axial distance 170 is the gap 172 less the thickness of the compressible member 160 when in a fully compressed state. Thus, the axial distance 170 limits the ability to rotate the projection 130 about the axis 126 relative to the portion 134 and, thus, limits the ability to rotate the sensor body 122 about the axis 126 relative to the main housing 120.

The total number of possible rotations of the projection 130 relative to the portion 134 may be determined by rotating the projection 130 about the axis 126 in one direction to drive the projection 130 along the axis 126 to one of the boundaries of the axial distance 170, such as in the direction 142 until engagement of the shoulder portions 144 and 146, as shown in FIG. 2. The limited number of rotations of the projection 130 about the axis 126 relative to the portion 134 may then be determined by rotating the projection 130 in the opposite direction until the second boundary is reached, such as the engagement between the compressible member 160 and the shoulder portion 158 when the compressible member 160 is in a fully compressed state.

In some embodiments, the total number of possible rotations corresponding to unique positions of the projection 130 along the axis 126 is greater than zero, but limited to approximately (e.g., ±15°) less than 6 rotations, less than 5 rotations, less than 4 rotations, less than 3 rotations, less than 2 rotations, 1 rotation, and/or less than 1 rotation, about the axis 126 relative to the portion 134. Therefore, the total number of rotations of the projection 130 relative to the portion 134 in a single direction is limited to these embodiments. As a result, the one or more wires 118 and their connections to the sensor circuitry 114 and the transmitter circuitry 104 are less likely to become damaged from rotation of the sensor body 122 relative to the housing 120.

Figure 6:
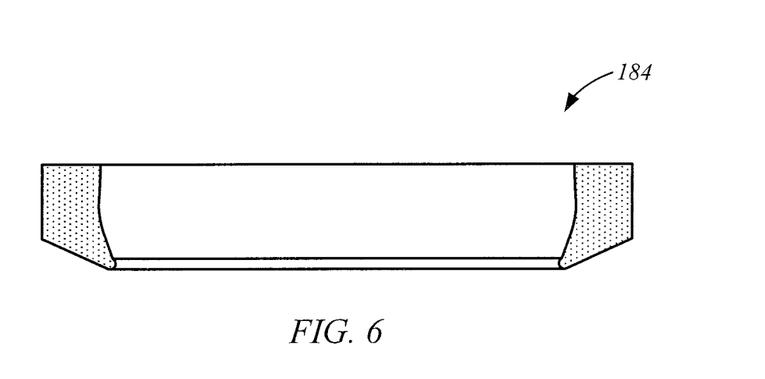
FIG. 6 is a side cross-sectional view of an exemplary scraper seal, in accordance with embodiments of the present disclosure.

In some embodiments, the rotatable coupling 124 includes one or more seals, which may allow the process transmitter 100 to meet explosion-proof requirements. For example, the rotatable coupling may include a seal 174 between the projection 130 and the portion 134. The seal 174 may be formed using an O-ring 175 that is received within a detent or groove of either the projection 130 or the portion 134, such as annular groove 176 formed in the projection 130, as shown in FIG. 2. The rotational coupling 124 may also include a seal 178 at a proximal end 180 of the projection 130, which may be formed using, for example, a V-ring 182, as shown in FIG. 2, a scrapper seal, an O-ring, or another suitable sealing element. A side cross-sectional view of an exemplary annular scraper seal 184 is shown in FIG. 6, and may be used as a substitute for the V-ring 182. The rotatable coupling 124 may also include other suitable seals in addition to, or in the place of, the seals illustrated in FIG. 2.

Specific details are given in the above-description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

It will be understood that when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings, or attachments between elements also include embodiments, in which the elements are indirectly connected through one or more intermediary components, coupled or attached to each other.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination. Certain features described in the context of various embodiments are not to be considered essential features of those embodiments, unless the embodiment is inoperative without those elements.

Although the embodiments of the present disclosure have been described with reference to preferred embodiments, workers skilled in the art will recognize that changes may be made in form and detail without departing from the spirit and scope of the present disclosure.

What is claimed is:

1. An industrial process transmitter comprising:
   a main housing containing transmitter circuitry and comprising a first threaded portion;
   a sensor body comprising a process sensor and a second threaded portion in threaded engagement with the first threaded portion, wherein one of the first and second threaded portions comprises a threaded cylindrical projection, and the other of the first and second threaded portions comprises a threaded cylindrical bore, wherein relative rotation between the sensor body and the main housing about an axis of the threaded cylindrical bore causes relative movement between the sensor body and the main housing along the axis, wherein the process sensor electrically couples to the transmitter circuitry through wires;
   a flange member received within a circular groove of the threaded cylindrical projection, wherein the flange member comprises circular compressible ring which fits in the circular groove, to thereby allow limited relative movement between the sensor body and the main housing along the axis of the threaded cylindrical bore; and
   a compressible member that is compressed in the axial direction and resists rotation of the sensor body relative to the main housing;
   wherein:
      movement of the sensor body relative to the main housing along the axis of the threaded cylindrical bore is restricted to an axial distance that is bounded through engagement between the flange member and the first or second threaded portion that includes the threaded cylindrical bore, and engagement between the main housing and the sensor body;
      rotation of the sensor body relative to the main housing about the axis is limited by the axial distance to thereby prevent damage to the wires that connect the process sensor to the transmitter circuitry;
      the compressible member is positioned between the flange member and a shoulder portion of the main housing or the sensor body that includes the threaded cylindrical bore and is compressed in the axial direction by an axial force applied between the flange member and the shoulder; and
      the compressible member comprises a wave ring.

2. The industrial process transmitter according to claim 1, wherein the axial distance limits rotation of the sensor body relative to the main housing to less than two rotations.

3. The industrial process transmitter according to claim 1, wherein the groove is an annular groove formed in a distal end of the threaded cylindrical projection.

4. The industrial process transmitter according to claim 3, wherein the flange member comprises a retainer ring.

5. The industrial process transmitter according to claim 1, wherein the first threaded portion comprises the threaded cylindrical bore, and the second threaded portion comprises the threaded cylindrical projection.

6. The industrial process transmitter according to claim 1, wherein the first threaded portion comprises the threaded cylindrical projection, and the second threaded portion comprises the threaded cylindrical bore.

7. The industrial process transmitter according to claim 1, further comprising at least one seal between the threaded cylindrical projection and the threaded cylindrical bore.

8. The industrial process transmitter according to claim 7, wherein the at least one seal comprises at least one of a V-ring, an O-ring, and a scraper seal.

9. The industrial process transmitter according to claim 1, wherein the process sensor is selected from the group consisting of a level sensor, a vibrating fork level switch, a pressure sensor, a flow rate sensor, a temperature sensor, and a control element.

10. The industrial process transmitter according to claim 9, including at least one wire extending from sensor circuitry contained in the sensor body through the threaded cylindrical bore and the threaded cylindrical projection and to the transmitter circuitry.

11. An industrial process transmitter comprising:
    a main housing comprising a cylindrical bore;
    transmitter circuitry contained in the main housing;
    a sensor body comprising a process sensor configured to sense an industrial process, and a cylindrical projection received within the cylindrical bore, wherein the process sensor electrically couples to the transmitter circuitry through wires;
    a flange member received within a circular groove of the cylindrical projection, wherein the flange member comprises circular compressible ring which fits in the circular groove, to thereby allow limited relative movement between the sensor body and the main housing along the axis of the cylindrical bore; and
    a compressible member compressed in a direction along an axis of the cylindrical bore;
    wherein;
       movement of the sensor body relative to the main housing along the axis of the cylindrical bore is restricted to an axial distance;
       movement of the sensor body relative to the main housing in a first direction along the axis is limited through engagement between the main housing and the flange member;
       movement of the sensor body relative to the main housing in a second direction along the axis is limited through engagement between the main housing and the sensor body;
       rotation of the sensor body relative to the main housing is resisted by the compressible member to thereby prevent damage to the wires that connect the process sensor to the transmitter circuitry;
       the compressible member is positioned between the flange member and a shoulder portion of the main housing or the sensor body that includes the cylindrical bore and is compressed in the axial direction by an axial force applied between the flange member and the shoulder; and
       the compressible member comprises a wave ring.

12. The industrial process transmitter according to claim 11, wherein:
    the cylindrical bore and the cylindrical projection include threaded portions in threaded engagement with each other;
    relative rotation between the sensor body and the main housing about the axis of the cylindrical bore causes relative movement between the sensor body and the main housing along the axis; and
    rotation of the sensor body relative to the main housing is limited by the axial distance.

13. The industrial process transmitter according to claim 12, wherein the axial distance limits rotation of the sensor body relative to the main housing to less than two rotations.

14. The industrial process transmitter according to claim 11, wherein:
    the groove is an annular groove; and
    the flange member comprises a retainer ring.

15. The industrial process transmitter according to claim 11, wherein:
  wherein the process sensor is selected from the group consisting of a level sensor, a vibrating fork level switch, a pressure sensor, a flow rate sensor, a temperature sensor, and a control element; and
  the industrial process transmitter includes at least one wire extending from sensor circuitry contained in the sensor body through the cylindrical bore and the cylindrical projection and to the transmitter circuitry.

16. The industrial process transmitter according to claim 11, further comprising at least one seal between the cylindrical projection and the cylindrical bore.

\* \* \* \* \*